United States Patent
Kondou (10) Patent No.: US 8,429,902 B2
(45) Date of Patent: Apr. 30, 2013

(54) SECONDARY AIR SUPPLY SYSTEM AND SECONDARY AIR SUPPLYING METHOD OF INTERNAL COMBUSTION ENGINE

(75) Inventor: Shinya Kondou, Gotemba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 311 days.

(21) Appl. No.: 12/595,843

(22) PCT Filed: Apr. 17, 2008

(86) PCT No.: PCT/IB2008/000927
§ 371 (c)(1),
(2), (4) Date: Oct. 14, 2009

(87) PCT Pub. No.: WO2008/129387
PCT Pub. Date: Oct. 30, 2008

(65) Prior Publication Data
US 2010/0126149 A1 May 27, 2010

(30) Foreign Application Priority Data

Apr. 18, 2007 (JP) ................ 2007-109886

(51) Int. Cl.
*F01N 9/00* (2006.01)
*F01N 3/10* (2006.01)
(52) U.S. Cl.
USPC ................ 60/289; 60/277; 60/285
(58) Field of Classification Search ............ 60/277, 60/285, 289
See application file for complete search history.

(56) References Cited

U.S. PATENT DOCUMENTS

| 5,584,177 | A | 12/1996 | Oketani et al. | |
| 5,675,968 | A | 10/1997 | Katashiba et al. | |
| 5,735,121 | A | 4/1998 | Kato et al. | |
| 6,085,517 | A * | 7/2000 | Bayerle et al. | 60/274 |
| 6,192,678 | B1 * | 2/2001 | Tachibana | 60/289 |
| 7,080,507 | B2 * | 7/2006 | Katogi et al. | 60/289 |
| 2005/0039445 | A1 * | 2/2005 | Boerkel | 60/289 |
| 2005/0274109 | A1 * | 12/2005 | Nakata et al. | 60/289 |

FOREIGN PATENT DOCUMENTS

| EP | 1 445 442 A1 | 8/2004 |
| JP | 09-096214 A | 4/1997 |
| JP | 2004-124824 A | 4/2004 |
| JP | 2005-036770 A | 2/2005 |
| JP | 2006-307811 A | 11/2006 |
| WO | 03/040528 A1 | 5/2003 |

* cited by examiner

Primary Examiner — Kenneth Bomberg
Assistant Examiner — Brandon Lee
(74) Attorney, Agent, or Firm — Sughrue Mion, PLLC (57) ABSTRACT

A secondary air supply system includes a secondary air supply device that supplies secondary air to the upstream side of an exhaust emission control device installed in an exhaust system of an internal combustion engine, and an ECU that estimates the secondary air temperature, and estimates the exhaust gas temperature after supply of secondary air, based on the result of estimation. The ECU starts or inhibits supply of secondary air by the secondary air supply device, depending on the result of estimation of the exhaust gas temperature. It is thus possible to prevent discharge of unburned fuel components, by estimating the exhaust gas temperature after supply of secondary air in view of the secondary air temperature.

6 Claims, 6 Drawing Sheets

SECONDARY AIR SUPPLY SYSTEM AND SECONDARY AIR SUPPLYING METHOD OF INTERNAL COMBUSTION ENGINE

INCORPORATION BY REFERENCE

The disclosure of Japanese Patent Application No. 2007-109886 filed on Apr. 18, 2007, including the specification, drawings and abstract is incorporated herein by reference in its entirety.

BACKGROUND OF THE INVENTION

1. Field of the Invention

This invention relates to secondary air supply system and secondary air supplying method of an internal combustion engine.

2. Description of the Related Art

An exhaust purifying catalyst, which is provided in an exhaust system of an internal combustion engine, has the function of reducing or removing harmful components contained in exhaust gas. The exhaust purifying catalyst normally exhibits its exhaust purifying capability in a specified temperature range. Thus, a secondary air supply system is known which causes new air to flow into exhaust ports when the temperature of the exhaust purifying catalyst is low, so as to re-burn harmful components contained in exhaust gas and expedite activation of the exhaust purifying catalyst, for reduction of the amount of the harmful components discharged or released to the atmosphere, as disclosed in, for example, Japanese Patent Application Publication No. 2004-124824 (JP-A-2004-124824) and Japanese Patent Application Publication No. 9-96214 (JP-A-9-96214).

However, if secondary air is supplied immediately after the engine is started, the harmful components, such as CO and HC, contained in the exhaust gas may not be re-burned because the temperature of the secondary air is low. In this case, the exhaust ports may be cooled by the low-temperature secondary air, which makes it difficult or impossible to activate the exhaust purifying catalyst, and the harmful components contained in the exhaust gas may be discharged into the atmosphere without being converted. To solve this problem, it is proposed in JP-A-2004-124824 to determine whether warm-up of the exhaust ports is completed by estimating the temperature of the exhaust ports, and start supply of secondary air when warm-up of the exhaust ports is completed, whereby the exhaust ports are prevented from being cooled by the secondary air.

However, neither JP-A-2004-124824 nor JP-A-9-96214 discloses a technology of estimating the exhaust gas temperature after the secondary air is supplied, by estimating the temperature of the secondary air itself.

SUMMARY OF THE INVENTION

The invention provides secondary air supply system and secondary air supplying method of an internal combustion engine, which prevent discharge of unburned fuel components, by estimating the exhaust gas temperature after supply of secondary air in view of the temperature of the secondary air.

According to one aspect of the invention, a secondary air supply system of an internal combustion engine is provided which includes: a secondary air supply device that supplies secondary air to the upstream side of an exhaust purifying catalyst installed in an exhaust system of the internal combustion engine, a secondary air estimating device that estimates a secondary air temperature of the secondary air, and an exhaust gas temperature estimating device that estimates an exhaust gas temperature after supply of secondary air, based on a result of estimation of the secondary air temperature estimating device, wherein the secondary air supply device starts or inhibits supply of secondary air, depending on a result of estimation of the exhaust gas temperature estimating device.

According to another aspect of the invention, a secondary air supplying method of an internal combustion engine is provided which includes the steps of: supplying secondary air to the upstream side of an exhaust purifying catalyst installed in an exhaust system of the internal combustion engine, estimating a secondary air temperature of the secondary air, estimating an exhaust gas temperature after supply of secondary air, based on a result of estimation of the secondary air temperature, and starting or inhibiting supply of secondary air, depending on a result of estimation of the exhaust gas temperature after supply of secondary air.

According to the secondary air supply system and secondary air supplying method of the internal combustion engine as described above, the exhaust gas temperature after supply of secondary air is estimated in view of the secondary air temperature, and the supply of secondary air is started or inhibited based on the estimated exhaust gas temperature. Therefore, unburned fuel components can be prevented from being discharged into the atmosphere because of a low exhaust gas temperature after supply of secondary air.

In the secondary air supply system as described above, the secondary air temperature estimating device may estimate the secondary air temperature, based on at least one of an intake air temperature and a temperature of an engine coolant. Since the secondary air temperature can be estimated in this manner, there is no need to provide a sensor for detecting the temperature of the secondary air.

In the secondary air supply system as described above, the exhaust gas temperature estimating device may estimate the exhaust gas temperature after supply of secondary air, based on the exhaust gas temperature before supply of secondary air, and the secondary air temperature estimated by the secondary air temperature estimating device.

In the secondary air supply system as described above, the exhaust gas temperature estimating device may estimate the exhaust gas temperature before supply of secondary air, based on at least one of the temperature of the engine coolant, an engine speed and a load of the engine.

In the secondary air supply system as described above, the secondary air supply device may include an air pump operable to supply the secondary air, and the secondary air temperature estimating device may estimate the secondary air temperature while making a correction to compensate for an increase in the secondary air temperature due to compression of the secondary air by the air pump.

According to the secondary air supply system as described above, the secondary air temperature can be estimated with improved accuracy since a correction is made to compensate for an increase in the temperature due to compression of the secondary air by the air pump.

In the secondary air supply system as described above, the secondary air temperature estimating device may estimate the secondary air temperature while making a correction to compensate for a change in the secondary air temperature due to heat received from the internal combustion engine.

According to the secondary air supply system as described above, the secondary air temperature can be estimated with improved accuracy since a correction is made to compensate for a change in the secondary air temperature due to heat received from the engine.

In the secondary air supply system as described above, the exhaust gas temperature estimating device may estimate the exhaust gas temperature after supply of secondary air in accordance with an intake air amount of the internal combustion engine.

According to the secondary air supply system as described above, the exhaust gas temperature after supply of secondary air can be estimated with improved accuracy, in accordance with the intake air amount of the internal combustion engine.

In the secondary air supply system as described above, the secondary air supply device may start or inhibit supply of secondary air, based on the exhaust gas temperature after supply of secondary air, which is estimated by the exhaust gas temperature estimating device, and a concentration of HC in an exhaust gas.

According to the secondary air supply system as described above, the supply of secondary air is started or inhibited based on the exhaust gas temperature after supply of secondary air and the concentration of HC in the exhaust gas, thus assuring more appropriate control with the HC concentration taken into consideration. More specifically, even where the exhaust gas temperature after supply of secondary air is low, the system can perform control that permits supply of secondary air if the HC concentration is high. This is because HC is likely to be burned when the HC concentration is high, even where the exhaust gas temperature is more or less low. With the HC concentration thus taken into consideration, the system can perform appropriate control according to the circumstances.

Thus, the secondary air supply system of the internal combustion engine according to the present invention is able to prevent the discharge of unburned fuel components, by estimating the exhaust gas temperature after supply of secondary air in view of the temperature of the secondary air.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENT

In the following description and the accompanying drawings, the present invention will be described in greater detail with reference to an exemplary embodiment.

Figure 1:
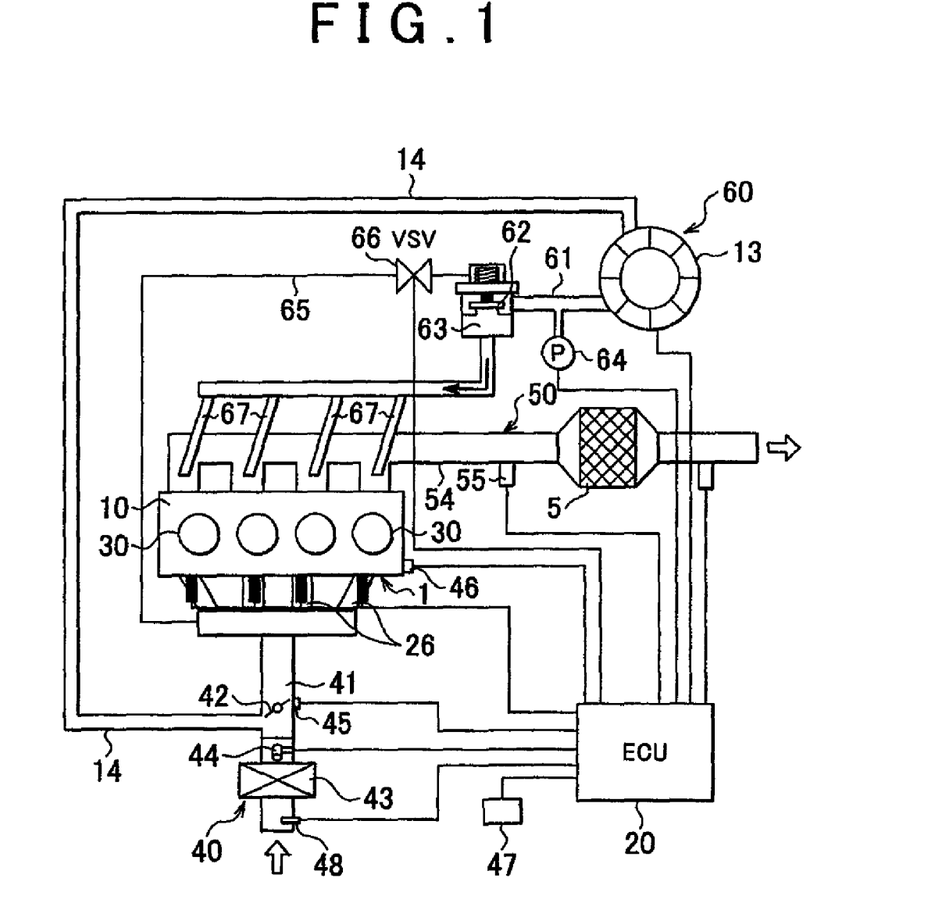
FIG. 1 is a view schematically showing the construction of an internal combustion engine provided with a secondary air supply system according to one embodiment of the invention.
Figure 2:
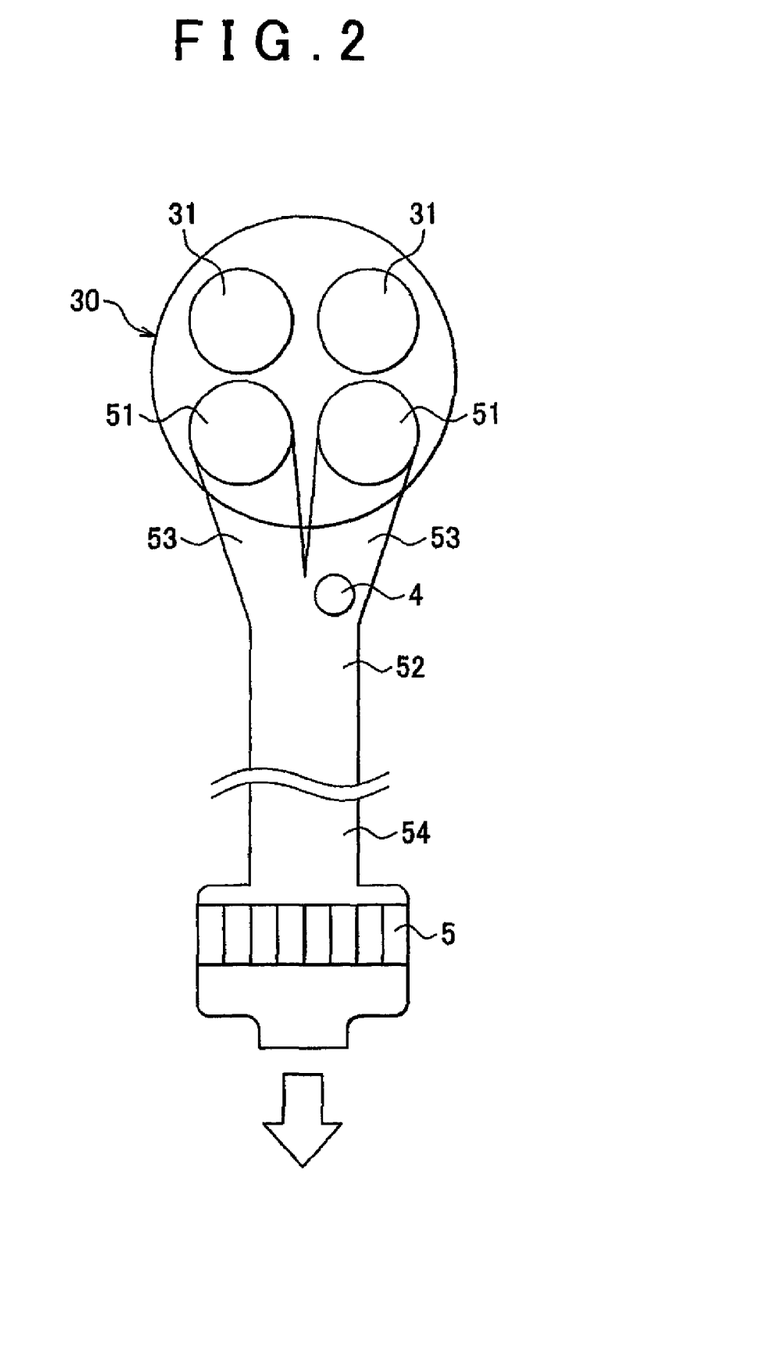
FIG. 2 is a view showing the structure of one of the cylinders of the internal combustion engine shown in FIG. 1.

FIG. 1 is a view schematically showing the construction of an internal combustion engine and its secondary air supply system according to the embodiment of the invention. The internal combustion engine 1 is a four-cycle gasoline engine having four cylinders 30, and a combustion chamber is formed on the top of a piston of each cylinder 30 such that the combustion chamber is surrounded by a top face of the piston and a wall of a cylinder head 10. Also, the engine 1 is provided with an intake system 40, an exhaust system 50 and a secondary air supply system 60. FIG. 2 shows the structure of one of the cylinders 30 shown in FIG. 1.

In the intake system 40, a throttle valve 42 is provided in an intake pipe 41 connected to intake branch pipes 26 corresponding to the respective cylinders 30, and the intake pipe 41 is connected to an air filter 43. An air flow meter 44 for measuring the intake air amount is disposed between the air filter 43 and the throttle valve 42. Also, an intake air temperature sensor 48 for detecting the temperature of the intake air is disposed upstream of the air filter 43.

In the exhaust system 50, an exhaust pipe 54 is formed which provides a passage through which exhaust gases discharged from the respective combustion chambers pass, and exhaust valves 51, exhaust ports 53, exhaust branch pipes 52 and the exhaust pipe 54 are connected in this order from the upstream end to the downstream end of the exhaust pipe 54.

An exhaust emission control device 5 is provided in the exhaust pipe 54, and a three-way catalyst having the function of removing hydrocarbon (HC), carbon monoxide (CO) and nitrogen oxides (NOx) contained in exhaust gas is disposed in a casing of the exhaust emission control device 5. An air-fuel ratio sensor 55 for detecting the air-fuel ratio of the exhaust gas is disposed in a portion of the exhaust pipe 54 located upstream of the exhaust emission control device 5.

The secondary air supply system 60 is arranged to supply air taken in from the outside of the engine 1, as secondary air, to each of the exhaust branch pipes 52.

On a secondary air supply pipe 61 of the secondary air supply system 60, an air pump 13, an air switching valve 62, and a reed valve 63 serving as a check valve are disposed or arranged in this order as seen from the upstream end thereof. A pressure sensor 64 is provided between the air pump 13 and the air switching valve 62. A pipe 65 that extends from a portion of the intake pipe 41 downstream of the throttle valve 42 is connected to the air switching valve 62, and a solenoid valve 66 is provided in the pipe 65.

The air pump 13, which is driven by an electric motor, includes a motor portion that is rotated/driven in response to a command from the outside, and a pump portion that is rotated/driven by the motor portion to pressurize air drawn into the air pump 13. The air pump 13 is operable to draw air from a portion of the intake pipe 41 (located upstream of the throttle valve 42 and downstream of the air filter 43) through an air induction passage 14. The air fed under pressure from the air pump 13 is supplied to the exhaust branch pipes 52, through the secondary air supply pipe 61 and distribution pipes 67 that branch off from the supply pipe 61.

Under principal conditions that the fuel concentration is high, the air-fuel ratio is small, and the exhaust emission control device has not reached its activation temperature during, for example, cold starting of the engine, the secondary air supply system as described above opens the solenoid valve 66 so as to apply a negative pressure or vacuum in the intake pipe 41 to the air switching valve 62 and open the air switching valve 62, and drives the air pump 13, so that part of the intake air that has passed through the air filter 43 can be introduced into the exhaust pipe 54 through the secondary air supply pipe 61 and the distribution pipes 67.

The internal combustion engine 1 is also provided with a crank position sensor 47 comprised of a timing rotor attached to an end portion of the crankshaft and an electromagnetic pick-up, and a water temperature sensor 46 mounted on the cylinder block for detecting the temperature of a coolant that flows in a coolant channel formed inside the engine 1.

FIG. 2 shows the structure of the exhaust ports 53 and exhaust branch pipe 52 in detail. Each of the cylinders 30 is provided with two intake valve 31 and two exhaust valves 51.

The exhaust branch pipe 52 is formed downstream of the exhaust ports 53 in which the exhaust valves 51 are provided, such that the exhaust branch pipe 52 is connected to the exhaust ports 53 of each cylinder. A plurality of exhaust branch pipes 52 corresponding to the respective cylinders are integrated, at the downstream thereof, into the exhaust pipe 54.

Also, a secondary air supply port 4 connected to each of the distribution pipes 67 is provided at the downstream side of the exhaust valve 51. With this arrangement, secondary air is supplied to the upstream side of the exhaust emission control device 5.

The internal combustion engine 1 constructed as described above is equipped with an electronic control unit (which will be referred to as "ECU") 20 for controlling the operating conditions of the engine 1.

Figure 3:
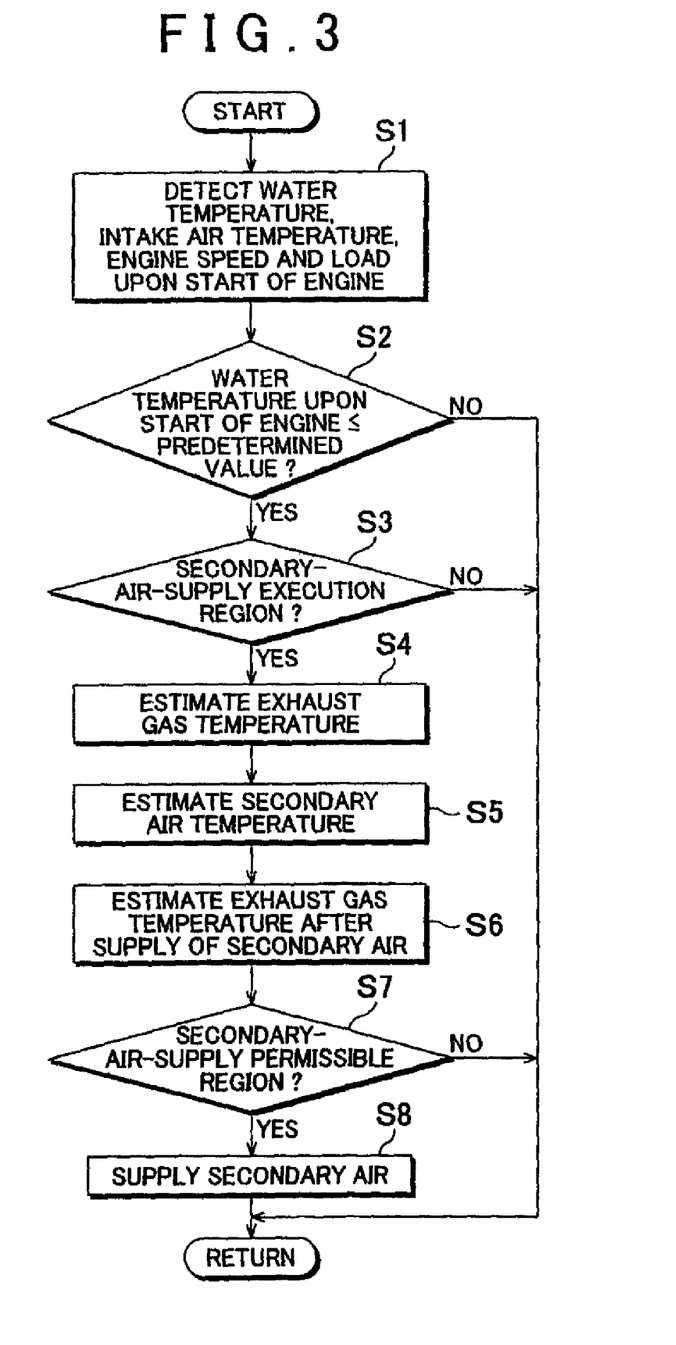
FIG. 3 is a flowchart illustrating one example of secondary air supplying process carried out by an ECU that controls the internal combustion engine.

Various sensors including, for example, the above-mentioned air flow meter 44, throttle position sensor 45, water temperature sensor 46 and the crank position sensor 47 are connected via electric wires to the ECU 20, and the ECU 20 is able to compute the fuel injection timing and the ignition timing, based on a signal received from the crank position sensor 47. The ECU 20 also performs control operations concerning the operating conditions of the engine 1, in particular, performs control for supplying secondary air to the respective exhaust ports 53, through driving of the air pump 13 and driving of the air switching valve 62 to the open/closed position. The flow chart represented in FIG. 3 represents an executable program logic included in the ECU 100 to perform the controls.

In the following, secondary air supply control will be explained. When the engine 1 operates under a condition that the temperature of the engine 1. is low, for example, at the time of start of the engine 1, it is a common practice to increase the amount of fuel supplied into the combustion chambers through fuel injection valves, in an attempt to make the engine combustion stable and expedite warm-up of the engine. However, if the amount of fuel is increased and the resulting air-fuel mixture becomes rich, unburned fuel components (such as HC and CO) in the exhaust gas increase. Furthermore, during cold starting of the engine, the temperature of the exhaust emission control device is low, and the catalyst has not been fully activated.

To make the air-fuel mixture rich when the catalyst temperature has not reached the activation temperature, for example, during cold starting, secondary air supply control is performed under which air is mixed into exhaust gas immediately after it is discharged from each combustion chamber, so as to promote oxidation of the unburned fuel components contained in the exhaust gas. In this manner, reactions for reducing or removing the unburned fuel components are promoted at locations upstream of the exhaust emission control device, and the heat of the reactions expedites activation of the catalyst of the exhaust emission control device.

If, however, secondary air is supplied immediately after the engine is started, for example, when the outside temperature is low, re-burning of the unburned fuel components, such as CO and HC, in the exhaust gas may not take place because of a low temperature of the secondary air. In view of this situation, the ECU 20 of this embodiment carries out the following process.

Initially, the ECU 20 detects the water temperature of the coolant, intake air temperature, engine speed, a load condition of the engine, and so forth, when the engine is started (step S1). More specifically, the ECU 20 detects the water temperature of the coolant based on a signal from the water temperature sensor 46, detects the intake air temperature based on a signal from the intake air temperature sensor 48, detects the engine speed based on a signal from the crank position sensor 47, and detects the engine load condition based on a signal(s) from the throttle position sensor 45, etc.

Subsequently, the ECU 20 determines whether the water temperature of the coolant detected upon start of the engine is equal to or smaller than a predetermined value (step S2). Here, the predetermined value is a reference value based on which it is determined whether the engine 1 need be warmed up. If the water temperature of the coolant is higher than the predetermined value, the engine 1 need not be warmed up. If the water temperature of the coolant is equal to or lower than the predetermined value, the engine 1 need be warmed up.

If it is determined that the engine 1 need be warmed up, it is determined whether the current operating conditions of the engine are within a secondary-air supply execution region in which supply of secondary air is feasible (step S3). More specifically, the ECU 20 make this determination based on the engine speed and the load condition of the engine.

If the current operating conditions of the engine are within the secondary-air-supply execution region, the ECU 20 estimates the temperature of exhaust gas based on at least one of the water temperature of the coolant, engine speed, engine load and other parameters, or based on all of these parameters (step 54).

Figure 4A:
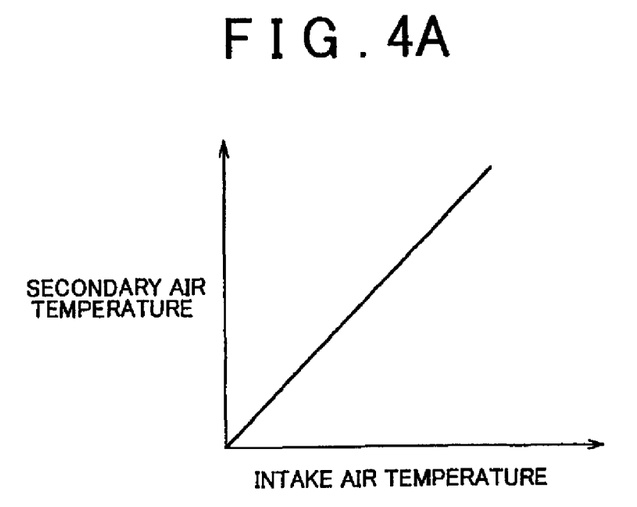
FIG. 4A is a map indicating the relationship between the secondary air temperature and the intake air temperature.

Subsequently, the ECU 20 estimates the temperature of secondary air based on the intake air temperature, coolant temperature, and others (step S5). In this embodiment, the ECU 20 estimates the secondary air temperature from the intake air temperature. Since the secondary air is supplied from the outside air, the secondary air temperature may be estimated to be substantially equal to the intake air temperature, as shown in FIG. 4A. In view of an increase in the temperature due to compression of secondary air by the air pump 13, the secondary air temperature may also be estimated to be about 1.1 times as high as the intake air temperature.

Figure 4B:
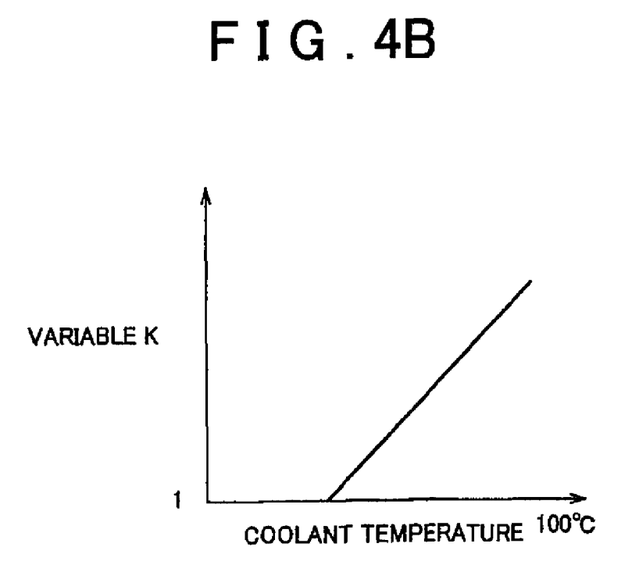
FIG. 4B is a map indicating the relationship between variable K and the coolant temperature.

Next, the secondary air temperature estimated from the intake air temperature is corrected based on the coolant temperature, since it is necessary to take account of an increase in the secondary air temperature due to heat received from the engine 1. More specifically, a variable K, which increases from 1 as the coolant temperature increases, is calculated, as shown in FIG. 4B. The variable K is defined as shown in FIG. 4B since the amount of heat the secondary air receives from the engine 1 is larger as the coolant temperature is higher. After the variable K is determined, the ECU 20 multiplies the secondary air temperature by the variable K. For example, when the coolant temperature is 80° C., the ECU 20 multiplies the secondary air temperature estimated based on the intake air temperature, by variable K=1.2, so as to make a final estimate of the secondary air temperature.

Figure 5A:
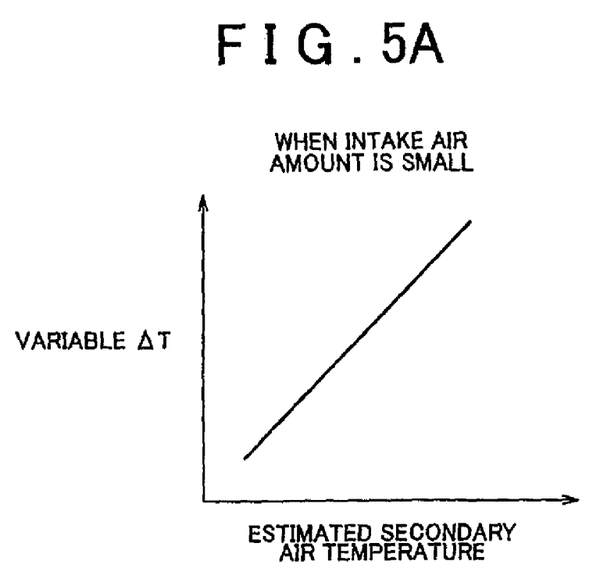
FIG. 5A is a map used when estimating the secondary air temperature, which shows the case where the intake air amount is small.
Figure 5B:
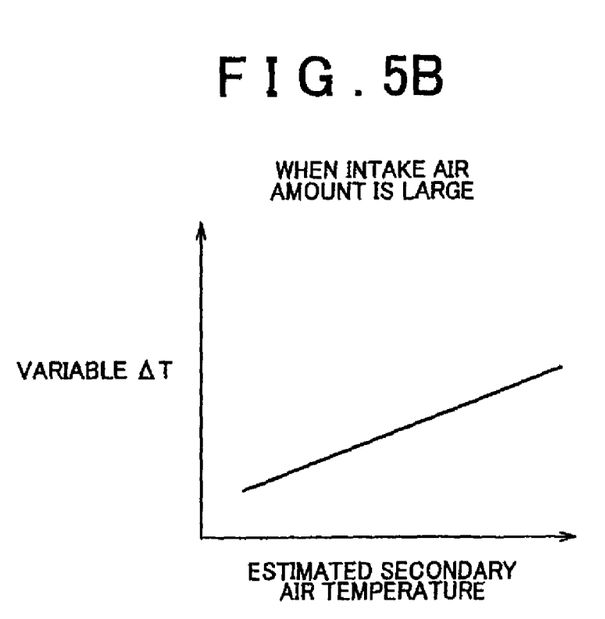
FIG. 5B is a map used when estimating the secondary air temperature, which shows the case where the intake air amount is large.

Subsequently, the ECU 20 estimates the exhaust gas temperature after supply of secondary air, based on the estimated secondary air temperature and the current exhaust temperature estimated in step S4 (step S6). More specifically, the ECU 20 calculates a variable ΔT based on the estimated secondary air temperature, as shown in FIGS. 5A, 5B. The variable ΔT is defined such that the variable ΔT increases as the estimated secondary air temperature is higher. The exhaust gas temperature after secondary air is supplied is estimated using the variable ΔT, more specifically, by subtracting the variable ΔT from the exhaust gas temperature (the current exhaust gas temperature) estimated before supply of secondary air.

Also, the ECU 20 has two or more maps for calculating the variable ΔT for each intake air amount. For example, the rate of reduction of the exhaust gas temperature after supply of secondary air must be large when the intake air amount is small, and it must be small when the intake air amount is large. Accordingly, the variable ΔT takes relatively large values when the intake air amount is small, as shown in FIG. 5A, and takes relatively small values when the intake air amount is large, as shown in FIG. 5B. In this connection, the intake air amount may be detected by the air flow meter 44.

After the variable ΔT is calculated, the ECU 20 estimates the exhaust gas temperature after supply of secondary air to be equal to a value obtained by subtracting the variable ΔT from the exhaust gas temperature estimated in step S4.

Next, the ECU 20 determines whether the current operating conditions of the engine 1 are within a permissible region in which supply of secondary air is permissible, or in an inhibited region in which supply of secondary air is inhibited, based on the exhaust gas temperature after supply of secondary air, which is estimated in the above-indicated step S6, and the current air-fuel ratio (step S7). The ECU 20 detects the air-fuel ratio based on an output signal from the air-fuel ratio sensor 55.

Figure 6:
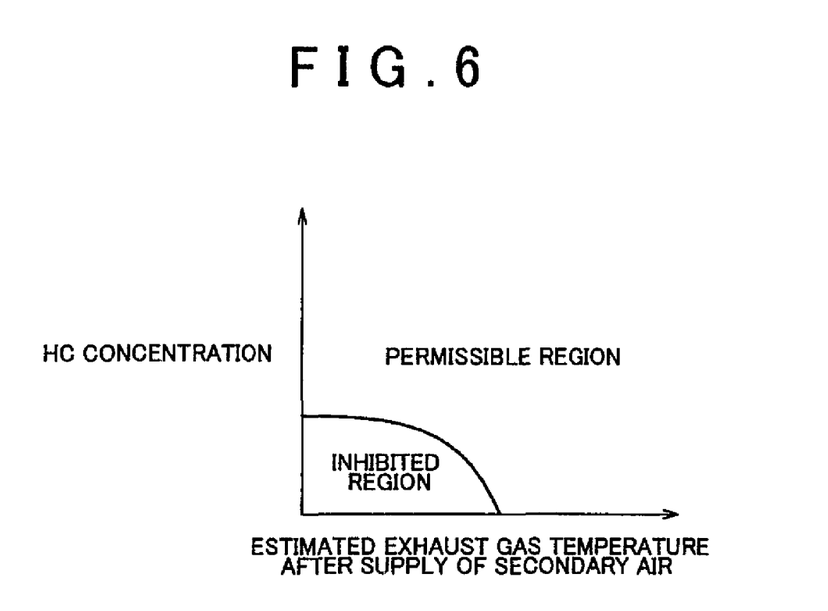
FIG. 6 is a map showing a secondary-air-supply permissible region and an inhibited region.

FIG. 6 is a map showing the permissible region and the inhibited region. In FIG. 6, the vertical axis indicates the HC concentration in the exhaust gas, and the horizontal axis indicates the estimated exhaust gas temperature after supply of secondary air. As shown in FIG. 6, even where the exhaust gas temperature after supply of secondary air is low, supply of secondary air is permitted if the HC concentration is high. This is because, when the HC concentration is high, HC is likely to be burned even if the exhaust gas temperature is more or less low. The ECU 20 determines the HC concentration, based on an output signal from the air-fuel ratio sensor 55.

Next, if it is determined in step S7 that the current engine operating conditions are within the secondary-air-supply permissible region, the ECU 20 actuates the air pump 13 and opens the air switching valve 62, thereby to start supply of secondary air (step S8). If it is determined in step S7 that the current engine operating conditions are within the inhibited region, secondary air is not supplied, and the process of FIG. 3 is finished.

As described above, the ECU 20 estimates the exhaust gas temperature after supply of secondary air, in view of the secondary air temperature, and starts or inhibits supply of secondary air depending on the estimation result. Thus, supply of secondary air can be inhibited when the exhaust gas temperature after supply of secondary air is too low, and supply of secondary air can be started when the exhaust gas temperature after supply of secondary air is sufficiently high, so that the unburned fuel components are prevented from being discharged or released to the atmosphere.

Also, since the ECU 20 can estimate the secondary air temperature based on the intake air temperature and the temperature of the engine coolant, there is no need to provide a sensor for detecting the temperature of the secondary air.

While the preferred embodiment of the invention has been described above in detail, the invention is not limited to the particular embodiment, but may be embodied with various modifications or changes within the range of the principle of the invention as defined in the appended claims.

The secondary air supply system may be arranged to detect the exhaust gas temperature, based on an output signal from an exhaust gas temperature sensor disposed in a portion of the exhaust pipe 54 upstream of the exhaust emission control device 5, and estimate the exhaust gas temperature after supply of secondary air, based on the detected exhaust gas temperature and the estimated secondary air temperature.

The invention claimed is:

1. A secondary air supply system for an internal combustion engine, comprising:
   a secondary air supply pipe that supplies secondary air to an upstream side of an exhaust purifying catalyst installed in an exhaust system of the internal combustion engine;
   a water temperature sensor that detects water temperature of an engine coolant that flows in the engine;
   an intake air temperature sensor, that detects temperature of intake air;
   an electronic control unit, including program logic, configured to perform:
      estimating an exhaust gas temperature before supply of the secondary air, based on at least one of a temperature of the engine coolant, an engine speed a load of the engine;
      estimating a temperature of the secondary air, based on at least one of an intake air temperature and the temperature of an engine coolant;
      estimating an exhaust gas temperature after supply of the secondary air, based on the estimated exhaust gas temperature before supply of the secondary air and the estimated secondary air temperature; and
      controlling starting or inhibiting supply of the secondary air, depending on the estimation of the exhaust gas temperature after supply of the secondary air.

2. The secondary air supply system according to claim 1, further comprising an air pump disposed at an upstream end of the secondary air supply pipe, operable to supply the secondary air, and
   the ECU including the program logic further configured to perform estimating the secondary air temperature while making a correction to compensate for an increase in the secondary air temperature due to compression of the secondary air by the air pump.

3. The secondary air supply system according to claim 1, wherein the ECU including the program logic estimates the secondary air temperature while making a correction to compensate for a change in the secondary air temperature due to heat received from the internal combustion engine.

4. The secondary air supply system according to claim 1, wherein the ECU including the program logic estimates the exhaust gas temperature after supply of the secondary air in accordance with an intake air amount of the internal combustion engine.

5. The secondary air supply system according to claim 1, wherein the ECU including the program logic controls the secondary air supply pipe to start or inhibit supply of the secondary air, based on the estimated exhaust gas temperature after supply of the secondary air and a concentration of HC in an exhaust gas.

6. A secondary air supplying method of an internal combustion engine, comprising:
- supplying secondary air to the upstream side of an exhaust purifying catalyst installed in an exhaust system of the internal combustion engine;
- estimating a secondary air temperature of the secondary air based on at least one of an intake air temperature and a temperature of an engine coolant;
- estimating an exhaust gas temperature after supply of the secondary air, based on the exhaust gas temperature before supply of the secondary air and the estimated secondary air temperature; and
- starting or inhibiting supply of the secondary air, depending on a result of estimation of the exhaust gas temperature after supply of the secondary air.

* * * * *